United States Patent [19]

Bode

[11] Patent Number: 4,557,374

[45] Date of Patent: Dec. 10, 1985

[54] MODULAR CONVEYOR BELTING WITH CAM-SLOTTED LINKS FOR MAINTAINING TRANSVERSE DISTRIBUTION OF TENSION WHILE NEGOTIATING HORIZONTAL CURVES AND FOR FACILITATING CLEANING

[75] Inventor: Robert H. Bode, Wenham, Mass.

[73] Assignee: The Cambridge Wire Cloth Company, Cambridge, Md.

[21] Appl. No.: 351,629

[22] Filed: Feb. 23, 1982

[51] Int. Cl.$^4$ ............................................. B65G 17/06
[52] U.S. Cl. .................................... 198/852; 198/831; 180/9.44; 305/39; 474/210; 474/230
[58] Field of Search .................... 198/831, 852, 853; 305/44, 58 R, 39, 54; 474/210, 228, 230, 234; 180/9.44

[56] References Cited

U.S. PATENT DOCUMENTS

| | | |
|---|---|---|
| Re. 30,341 | 7/1980 | Lapeyre . |
| D. 231,633 | 5/1974 | Totani et al. . |
| D. 248,826 | 8/1978 | Lehtola . |
| D. 263,228 | 3/1982 | Nitz et al. . |
| D. 270,201 | 8/1983 | Hodlewsky et al. . |
| D. 270,202 | 8/1983 | Hodlewsky et al. . |
| 263,699 | 9/1882 | Heebner . |
| 289,466 | 12/1883 | Stutz . |
| 304,193 | 8/1884 | Harrison . |
| 355,513 | 1/1887 | Dodge . |
| 561,162 | 6/1896 | Furbush . |
| 1,714,721 | 5/1929 | Mojonnier . |
| 1,755,450 | 4/1930 | Mojonnier . |
| 1,861,840 | 6/1932 | Claghorn . |
| 2,000,499 | 5/1935 | Roland . |
| 2,038,695 | 4/1936 | Wilmot . |
| 2,059,063 | 10/1936 | Tourville . |
| 3,073,430 | 1/1963 | Quinn . |
| 3,191,743 | 6/1965 | Rissler et al. . |
| 3,202,260 | 8/1965 | Wolf . |
| 3,214,007 | 10/1965 | Matthies et al. . |
| 3,237,756 | 1/1966 | Pulver . |
| 3,261,451 | 7/1966 | Roinestad . |
| 3,311,222 | 3/1967 | Crawford et al. . |
| 3,651,924 | 3/1972 | Homeier et al. . |

(List continued on next page.)

FOREIGN PATENT DOCUMENTS

| | | | |
|---|---|---|---|
| 222568 | 12/1961 | Austria | 305/58 |
| 3210 | 1/1981 | Japan | 198/853 |

OTHER PUBLICATIONS

Intralox All-Plastic Conveyor Belting; Engineering Design Data, by Intralox, Inc., New Orleans, LA 70150, 24 pages and covers, 3 page supplement, dated Oct. 1, 1983.
Rex Mat Top Chains; for Versatile, Economical, Dependable Conveying, by Rexnord, Inc., Milwaukee, WI 53201, 21 pages and cover, ©1981.
KVP; All-In-One Plastic Belt, KVP Company, Sacramento, CA 95826, 4 pages, no date.
Ashworth's Prestoflex Conveyor Belting; A Guide to Performance Properties, by Ashworth Bros., Inc., Winchester, VA 22601, 11 pages and cover, 1982-1983.
Alloy Plus . . . ; Introducing . . . Plastic Modular Belting, by Alloy Wire Belt, California, 2 pages, no date.
Plastic Modular Honeyflex by Umec-Boydel (Belting) Limited, Wolverhampton, England, 2 pages, Mar. 1979.
Wiremation Plastic Belting Strength & Versatility, Wiremation Industries, Lancaster, PA 17604, 10 pages and covers, no date.

Primary Examiner—Joseph J. Rolla
Attorney, Agent, or Firm—Cushman, Darby & Cushman

[57] ABSTRACT

Especially for modular conveyor belting that is capable of negotiating both horizontal curves and vertical ones, belt tension is spread across the belt using, for each respective set of interconnected links, a rod which can be cammed vertically against an inclined surface at a lateral margin of the belt as a horizontal curve is negotiated, thereby altering the distance between the links in the set. In various embodiments, the camming force is supplied by a conveyor bed rail surface provided in the turn, by the gravity force on at least one link in each set or by rotation of the rod. In preferred embodiments, the cam slots are relieved to facilitate cleaning. Even where horizontal turning is not required, some cammed adjustment is preferably provided, again to facilitate cleaning.

72 Claims, 21 Drawing Figures

U.S. PATENT DOCUMENTS

| | | |
|---|---|---|
| 3,774,752 | 11/1973 | Harvey . |
| 3,785,476 | 1/1974 | Poerink . |
| 3,870,141 | 3/1975 | Lapeyre et al. . |
| 4,051,949 | 10/1977 | Lapeyre . |
| 4,058,021 | 11/1977 | Wood . |
| 4,080,842 | 3/1978 | Lapeyre et al. . |
| 4,138,011 | 2/1979 | Lapeyre . |
| 4,140,025 | 2/1979 | Lapeyre . |
| 4,153,152 | 5/1979 | Lapeyre . |
| 4,159,763 | 7/1979 | Kewley et al. . |
| 4,171,045 | 10/1979 | Lapeyre . |
| 4,184,588 | 1/1980 | Lapeyre . |
| 4,213,527 | 7/1980 | Lapeyre et al. . |
| 4,276,980 | 7/1981 | Oizumi ............................ 198/853 X |
| 4,394,901 | 7/1983 | Roinestad . |
| 4,438,838 | 3/1984 | Hodlewsky et al. . |

Fig. 10 — STRAIGHT ROD CAMMING

Fig. 11 — STRAIGHT ROD CAMMING

"FOOT" CAMMING  "IN SLOT" CAMMING

FOR HYBRED LINK
CAMMING

MODULAR CONVEYOR BELTING WITH CAM-SLOTTED LINKS FOR MAINTAINING TRANSVERSE DISTRIBUTION OF TENSION WHILE NEGOTIATING HORIZONTAL CURVES AND FOR FACILITATING CLEANING

BACKGROUND OF THE INVENTION

For process and container modular conveyor belting that is capable of negotiating horizontal curves as well as vertical ones, longitudinal tension in the belting usually is supported by a medial spine, or by the provision of outside tension members at the lateral margins, these tension members usually being structurally stronger than the intermediate portion of the belting.

SUMMARY OF THE INVENTION

Especially for modular conveyor belting that is capable of negotiating both horizontal curves and vertical ones, belt tension is spread across the belt using, for each respective set of interconnected links, a rod which can be cammed vertically against an inclined surface at a lateral margin of the belt as a horizontal curve is negotiated, thereby altering the distance between the links in the set. In various embodiments, the camming force is supplied by a conveyor bed rail surface provided in the turn, by the gravity force on at least one link in each set or by rotation of the rod. In preferred embodiments, the cam slots are relieved to facilitate cleaning. Even where horizontal turning is not required, some cammed adjustment is preferably provided, again to facilitate cleaning.

The principles of the invention will be further discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWINGS

In the Drawings

FIG. 3 is a vertical cross-sectional view on line 3—3 of FIG. 2a;

DETAILED DESCRIPTION

Figure 1:
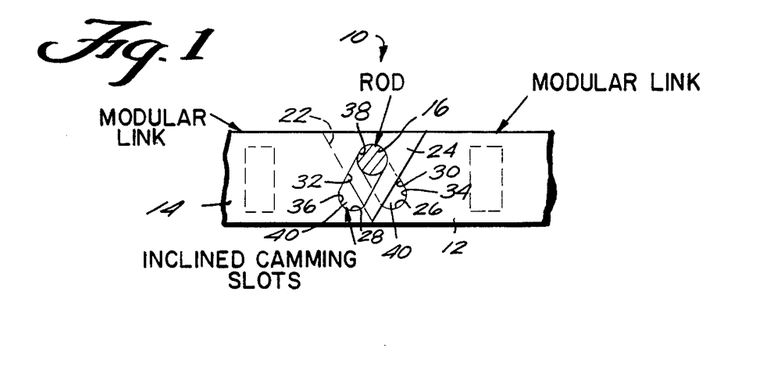
FIG. 1 is a fragmentary side elevational view of a first embodiment of the belting, showing two links interconnected by a rod.

In FIG. 1, a long, usually continuous conveyor having a conveyor belt constituted by a series of like or similar modules pivotally connected to one another, is typified at 10 by two of the modules and one rod. The modules are sometimes termed links or modular links in this description.

For convenience, in regard to FIG. 1 and the other side views, the conveyor belt may be assumed to be advancing toward the right. Accordingly, link 12 is a leading link and link 14 is a trailing link.

The belt 10 is shown being of indeterminate width since it may be one module wide, or two or several modules wide. Each relatively leading link 12 is pivotally connected to a respective relatively trailing link, by means of a pivot pin or rod 16.

The modules 12, 14 as seen in plan (FIG. 2) each have an axially-centrally located body 20 both axially (i.e. longitudinally) trailed and led by a respective set of link end portions 22, 24. For each two modules which adjoin one another longitudinally of the belt, the link end portions 22 at the trailing end of the body of the leading link 12 interdigitate with the link end portions 24 at the leading end of the body of the trailing link 14, so that there is a mutually accommodated longitudinal-direction overlap of the trailing and leading margins of adjacent links along the length of the belt.

Figures 2, 2A:
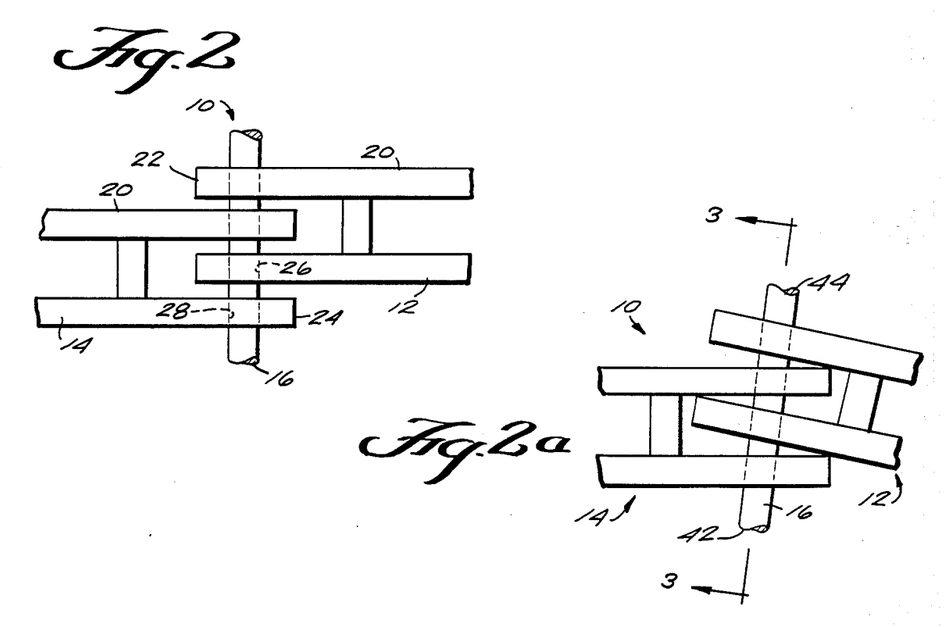
FIG. 2 is a top plan view thereof.
FIG. 2a is a top plan view similar to FIG. 2, but at a moment when the portion shown is executing a horizontal turn (to the right, coming up out of the plane of the view, toward the viewer), the conveyor bed and inside rail being schematically suggested.

Each link end 22, 24, has an opening 26, 28 formed through it proceeding directly crosswise of the belt 10. Each opening 26, 28 is located generally centrally of the respective link end so that there is a material of which the link end is constituted, surrounding each opening 26, 28, except at the lateral faces of the link ends.

In assembling the belt 10, a leading link 22 is interdigitated with a trailing link 14, so that all of the link end openings 26 of the leading link are aligned directly across the width of the belt, with all the link end openings 28 of the trailing link. Then the rod 16 is inserted through all the aligned openings 26, 28 all the way across the belt 10. The rod 16 is provided with upsets at each end (not shown), or with an upset between two link ends or the like to prevent the rod from slipping out of the link ends. The upset or either upset may be integral, or removable. Where the only upset or both upsets are integral, link or rod replacement, or opening-up of the belt at a rod is accomplished by severing the rod or deforming the upset and, later, replacing that rod upon reassembling the belt. If the belt 10 is more than one module wide, the installation of a rod 16 creates two respective units from the modules in the two rows of modules thereby pivotally connected together.

All of the foregoing is conventional, for belts which are made to run in straight runs, with no horizontal curves, but only with vertical curves e.g. about horizontal-axis drive and/or idler sprockets (not illustrated).

This kind of belting as so far described is widely-used in food processing and container-conveying operations, among others.

Often in such operations, it is necessary or desirable for the belting to be able to negotiate a horizontal curve, i.e. while remaining same-side-up, curve around to the left or to the right. It is not uncommon for there to be a need to turn only in one angular sense, e.g. to curve continuously to the left while ascending, thereby providing an ascending spiral.

In this field, horizontal and vertical are terms of art. "Horizontal" means in or parallel to the plane of the article-supporting surface of the link no matter what the attitude of the link and "vertical" means normal to that surface. The meaning in the art coincides with the usual meaning when the link is positioned right-side-up with the support surface presented upwardly and level, i.e. horizontal. The terms are used herein in their art sense unless the more restricted usual meaning is required by the context.

Figure 3:
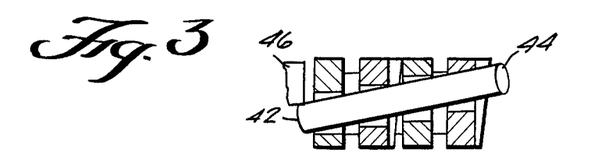

As a point of departure, it is to be noticed about the belting shown in FIGS. 1–3, that all of the link end openings 26, 28 are of slot shape i.e. with a closed perimeter but being non-circular in cross-section, and each slot has a perimetrical portion 30, 32 of its sidewall 34, 36 that functions as a cam surface. The rest of the cam slot sidewall generally surrounds the rod 16, but is subject to more freedom in design since it usually is not working as a cam surface. The cam surfaces 30 and 32 are oppositely obliquely oriented.

As the conveyor belt 10 advances particularly in a straight run there is a tension in the belt that manifests itself in a tendency of the connected links 12 and 14 in longitudinally adjoining rows to pull as far apart as the rod 16 which interconnects them will permit.

In a prior art modular belt in which the rods are received in round openings in the pintles any pulling apart and pushing together from a datum amount is generally exclusively in a longitudinal direction with no vertical component, e.g. due to the accumulation of differences between pin and opening diameters and/or locations due to design, flexibility and wear.

The slots 26, 28 as shown (FIG. 1), are of the simplest shape that provides the obliquely-oriented cam surfaces 30 and 32, i.e. generally straight slots with rounded ends. The slot 26 on each leading link trailing link end slopes up to the rear a slash down to the front and the slot 28 on each trailing link leading link end slopes up to the front/down to the rear.

Thus, as the conveyor belt 10 advances in a straight run, the respective rod 16 rides at the upper end 38 of each slot 26, 28 so that the modules 12 and 14 are normally pulled maximally apart to a uniform degree across the entire width of the belt 10, as illustrated in FIGS. 1 and 2.

However, the leading and trailing links 12, 14 need not be travelling in a straight run in order for all the openings 26, 28 to remain sufficiently aligned to accommodate the rod 16. If, while the modules 12, 14 are in tension they are directed about a lateral turn by any suitable means, the place where each slot 26 crosses a slot 28 remains progressively the same, crosswise of the belt towards the outside of the curve, but becomes progressively lower and progressively toward the body of the link, crosswise of the belt towards the inside of the curve. This vertical and longitudinal displacement of the overlap is greater the smaller the radius of the horizontal curve, to an extreme where, at the inside of the curve, the location of the overlap is at the lower ends 40 of the slots 26, 28. At this extreme, the height of the overlap progressively varies from bottom to top of the slots, from the inside of the curve to the outside of the curve. Depending upon the geometry and the dynamics the links may tend to tip upward at the outside of the curve and to tip downward at the inside of the curve. In a practical installation, the lateral tilting may be accommodated by supporting the conveyor belt in a manner that keeps the links acceptably level across their width even in the horizontal turns.

According to the principles of the present invention, the taking-up and paying out of the excess conveyor module length on the inside of horizontal curves are accommodated by correspondingly lowering and raising the laterally inner end 42 of each rod 16. The amount of vertical movement, the number of rods 16 in some stage of being vertically moved, and the duration of the vertical movement depend upon the abruptness and radius of the curve, the angular extent and length of the curve and the speed of advance of the conveyor belt.

As the rod inner end 42 is pushed down, the rod outer end 44 remains up, the effect of thusly tilting the rod laterally of the belt (FIG. 3) is to force a progressively greater degree of interdigitation of the link ends 22 and 24 across the width of the belt from the outside to the inside of the curve, as the corresponding bands of the rod 16 push downwardly on the oppositely-inclined cam surfaces 30 and 32. When the downward force being applied on the rod 16 inner end 42 is reduced and extinguished, the usual longitudinal tension in the conveyor belt elevates the rod to its raised, level condition as the degree of longitudinal overlap of the leading and trailing links 12, 14 is again uniformly minimized across the width of the belt.

Where the belt 10 is arranged to run on a support means such as a bed, on the inside of the horizontal curve, this bed may be provided with a rail 46 which dips down and then back up again. As the links 12, 14 come into the curve, the inner end 42 of the rod 16 comes under the rail 46 and is temporarily pushed-down as it goes under the dip in the rail 46.

Figure 4:
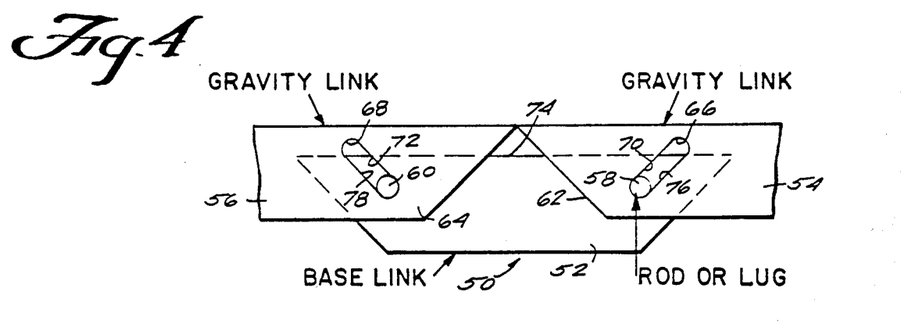
FIG. 4 is a fragmentary side elevational view similar to FIG. 1, but of a second embodiment of the belting.

A second embodiment is illustrated in FIG. 4. For this alternative, the conveyor belt 50 includes two types of links, base links 52 alternated with gravity links 54, 56. Each base link 52 is designed to contact and ride on the conveyor bed (not shown) and to have two rods or sets of lugs 58, 60 which are disposed a fixed distance apart. The rods or lugs 58, 60 project laterally from the base link 52 so as to provide four pivot pins (including the two seen projecting up out of the plane of the Figure and two corresponding ones, not shown, which project down below the plane of the Figure). The implication of "pins" is two continuous members fixed or fitted in corresponding bores through the base link, whereas the implication of "lugs" is four stubs fixed or fitted in corresponding sockets in the base link or four stubs integrally formed on the base link. The pivot pins 58, 60 are located relatively high on the base link 52 all at the same level and project laterally therefrom near the leading and trailing ends of the link 52. The gravity links 54, 56 lead and trail the base link and have slotted link ends 62, 64. The leading gravity link 54 has at least two laterally spaced such trailing link ends 62 provided with oblique slots 66 which receive the respective pivot pins 58. The trailing gravity link 56 has a corresponding at least two laterally spaced such leading link ends 64 provided with oblique slots 68 which receive the respective pivot pins 60.

(The not shown leading portion of the leading gravity link 54 looks like the shown leading portion of the trailing gravity link 56 and the not shown trailing portion of the trailing gravity link 56 looks like the shown trailing portion of the leading gravity link 54.)

The slots 66, 68 are shown being simple oblique slots with opposite orientation to those shown in FIG. 1. The slots 66 slope upward-forwardly and the slots 68 slope upward-rearwardly. The downwardly facing segments 70, 72 of the respective slot sidewalls provide cam surfaces. When the pivot pins 58, 60 are received in the slots 66, 68 and the conveyor belt 50 is normally in tension, in the straight runs, the gravity links tend to ride high, with the pins 58, 60 at the bottoms of the slots 66, 68, substantially at maximum longitudinal separation of the gravity links, even when the support surfaces 74 of the gravity links are carrying material being conveyed.

Upon entering a horizontal curve of the conveyor, e.g. due to guiding of the base link 52 relative to the conveyor bed (not shown), on the inside of the curve only, the gravity links 54 and 56 move towards one another. If, due to the geometry of the belt modules the respective link ends 62, 64 need to be able to overlap on the inside of the curve in order to accomplish this, the respective link ends may be staggered laterally. The weight of the gravity links, particularly but not always essentially while material is being conveyed on the support surfaces 74, automatically depresses the respective corner or side of each of the gravity links on the curve. The structure of the conveyor bed, if suitably correspondingly laterally pitched causes the laterally pitched gravity links in the curve to continue to have levelly horizontal support surfaces 74.

Coming out of the curve, the tension on the conveyor belt 50 pulls the slots 66, 68 up along the pins on what had been the inside of the curve, thus raising what had been the depressed side of the gravity links and levelling out the gravity links at the relatively high level shown in FIG. 4.

Figure 5:
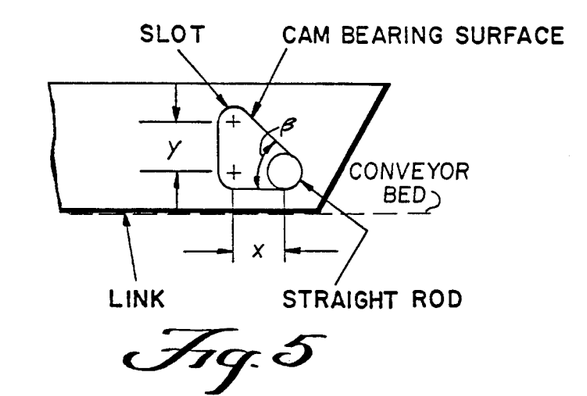
FIG. 5 is a fragmentary side elevational view of a preferred link, showing generally triangular relief of the cam slot to facilitate cleaning.
Figure 6:
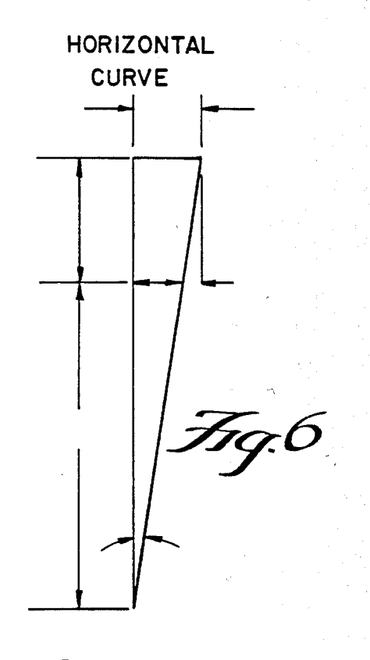
FIG. 6 is a diagram which is referred to in connection with describing the selection of cam slot geometry for particular horizontal turn radii.

In both moving down and moving up on the pins 58, 60, it is the downwardly facing cam surfaces 70, 72 of the slot sidewalls which coact with the pins 56, 60 to vertically and longitudinally move the gravity links relative to one another on the inside of the curve. Accordingly, there is more freedom in selecting the disposition of the remainders 76, 78 of the slot 66, 68 sidewalls. By preference, in view of this degree of freedom, in the more preferred embodiments of the invention which are shown in FIG. 5 and subsequent figures, the remainder portion of the peripheral sidewall of each slot, i.e. the portion which does not function as the cam surface is going into, negotiating and coming out of a horizontal turn is moved relatively back out of the way. This makes each respective slot have more area, i.e. be larger and more relieved in comparison with the minimum width slot needed to permit the same path of movement of the links.

It is considered considerably advantageous to provide the cut-away portions of the slots for installations where the conveyor belt is to be used in food processing operations or in like instances where requirements for frequent, careful cleaning are imposed. Simply stated, the enlargement of the slots enhances cleanability of the pin/slot/link interfacial regions without detracting at all from the interaction of the lugs or bars and cam surfaces.

Referring to FIG. 5, the first preferred relieved slot shape is that of a right triangle, with rounded corners. For the slot geometry that is presented in FIG. 5, the horizontal, longitudinal distance x represents the closeability or pitch of the link in negotiating a horizontal curve. The cam surface is in this instance the obliquely downwardly facing leg of the triangular sidewall of the slot. The vertical camming distance is indicated at y, and the cam angle, which is that angle formed by the cam bearing surface of the slot and the horizontal, is designated $\beta$.

A sample calculation of the cam slot shape is now given, with reference to FIGS. 5–9:

$$x = P - MP \quad (1)$$

$$x = P - \frac{P(IR)}{IR + BW} \quad (2)$$

$$x = P\left(1 - \frac{IR}{IR - BW}\right) \quad (3)$$

where
IR = inside radius of the horizontal curve, inches
BW = belt width (inches),
n = the ratio of IR to BW = (IR/BW)
P = link maximum pitch (inches),
MP = minimum pitch at internal radius (IR) of belt (inches),
x = P − MP = difference between P and MP or link closeability (inches),
y = vertical camming distance (inches) = tan $\beta$x,
$\beta$ = slot angle, the angle between camming bearing surface of the slot and the horizontal, and
$\alpha$ = the angle formed by segment of the maximum pitch at the outside of the horizontal curve in relation to the center of the internal radius of the horizontal curve.

Figure 7:
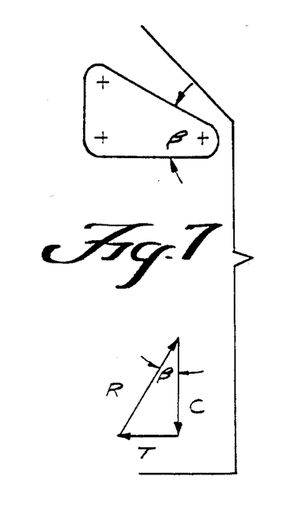
FIGS. 7, 8 and 9 are pairs of corresponding diagrams (slot shape, above, and force diagram, below) for illustrating the effect of cam surface pitch on camming action.
Figure 8:
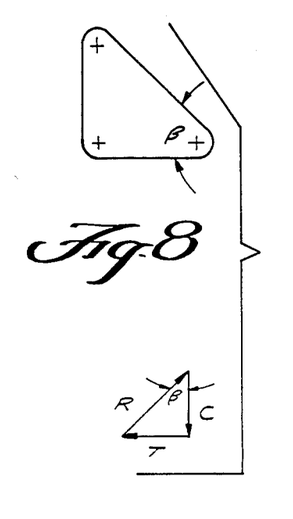
Figure 9:
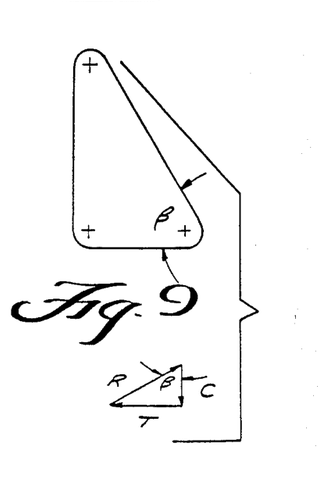

The effect of slot angle, $\beta$, on link forces may be seen in FIGS. 7–9 as a function of steepness of the slot. For equal belt tension forces T, the vertical camming force, C, and the resultant force, R, on the cam angle bearing surface are decreased as a function of the steepness of slot angle, $\beta$. In FIG. 7, the slot angle is 30°; in FIG. 8, the slot angle is 45°; and in FIG. 9, the slot angle is 60°. The steeper the slot angle, the less is the camming, C, and resultant, R, forces.

$$R = (T/\sin \beta) \quad (4)$$

$$C = (T/\tan \beta) \quad (5)$$

where:
T = Horizontal Belt Tension Force on Slot (pounds),
R = Resultant Force Normal to Slot Bearing Surface (pounds), and
C = Vertical Camming Force on Rod (pounds).

In the ensuing figures there are shown several practical embodiments which make use of the opened-up, relieved, easy-to-keep-clean slots which have just been described in regard to FIGS. 5–9.

STRAIGHT ROD, EXTERNAL CAMMING, UPRIGHT SLOTS

Figure 10:
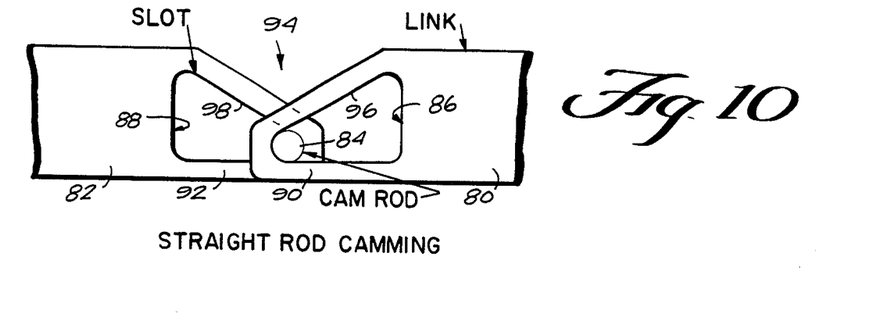
FIG. 10 is a fragmentary side elevational view similar to FIG. 1, but of a third embodiment, employing links with the relieved slot shape and orientation of FIGS. 5-9.

In FIG. 10, a leading link 80 and a trailing link 82 are shown pivotally interconnected by a straight rod 84 which is received through slots 86, 88 in link ends 90, 92, aligned transversally of the conveyor belt 94. Again, there are several link ends 90 intercalated with several pintles 92 with the rod 84 passing through all the slots 86, 88 and having either an end portion which protrudes laterally past the last link ends on what will be the inside of the curve, or which is accessible for external engagement even though such end portion is located between two link ends near what will be the inside of the curve. The slots 86, 88 have what is herein arbitrarily designated an "upright" orientation: the respective cam surfaces 96, 98 face obliquely downwards and the rod 84 normally rides at the low ends of cam surfaces. For negotiating a horizontal curve, the aforesaid inner end portion of the rod 84 is cammed upwardly by an inside rail (not shown), associated with the conveyor bed (not shown) while an inside foot (not shown) on the links 80, 82 (or on at least one of them), rides underneath the inside rail to prevent the conveyor belt from being simply lifted up off the conveyor bed as the inner end of the rod 84 is lifted. Accordingly, as the inner end of the rod 84 is lifted, the rod 84, coacting with the cam surfaces 96, 98 forces the links 80, 82 into a greater degree of longitudinal overlap at the inside of the curve. As the conveyor belt comes out of the horizontal curve, the bed-associated inner rail upper surface lowers to its usual, datum weight, and the usual longitudinal tension on the conveyor belt pulls the links 80, 82 longitudinally apart as far as they will go, as the rod 84 moves back down to the level disposition shown in FIG. 10.

At the places where the rod 84 and the link inner foot engage the inside rail a horizontal curve, frictional forces may be reduced by providing rollers, dynamic wheels, continuous belts and the like at the interfaces as will be understood in the art.

STRAIGHT ROD, EXTERNAL CAMMING, INVERTED SLOTS

Figure 11:
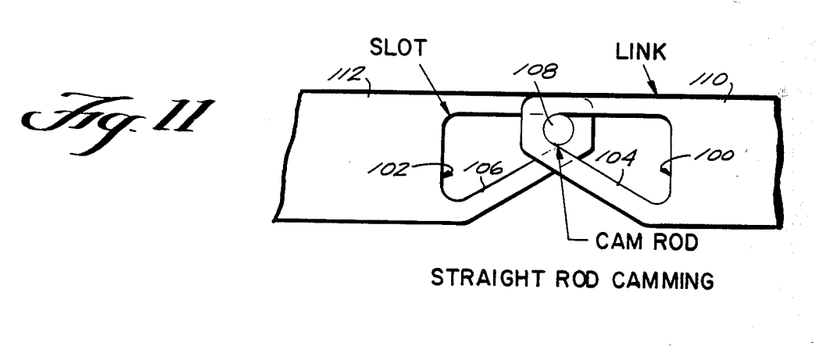
FIG. 11 is a fragmentary side elevational view similar to FIG. 6, but of a fourth embodiment, employing links with the relieved slot shape of FIGS. 5-11, but an inverted orientation.

The construction shown in FIG. 11 is identical to that shown in FIG. 10, except that the slots 100, 102 are inverted, so that the oblique cam surfaces 104, 106 face upwardly and the straight rod 108 normally rides at the upper ends of the cam surfaces 104, 106. In a horizontal curve, in order to increase the longitudinal overlap of the links 110, 112, on the inside of the curve, the inner end of the rod 108 is run under a downwardly-dipping inner rail (not shown) associated with the conveyor bed (not shown). The rod 108 is thus temporarily forced into an oblique condition, dipping down towards the inside of the curve, in turn pushing downwards on the upwardly-facing oblique cam surfaces 104, 106 and correspondingly temporarily forcing the links 110, 112, into a greater degree of longitudinal overlap on the inside of the curve. As the conveyor belt comes out of the curve, the dip in the inside rail gradually ends and the usual tension in the belt pulls the low end of the rod 108 back up to the level shown in FIG. 11, with corresponding maximum uniform de-intercalation of the links 110, 112 across the width of the conveyor belt.

STRAIGHT ROD OR LUGS, GRAVITY-ASSISTED CAMMING, UPRIGHT SLOTS

Figure 12:
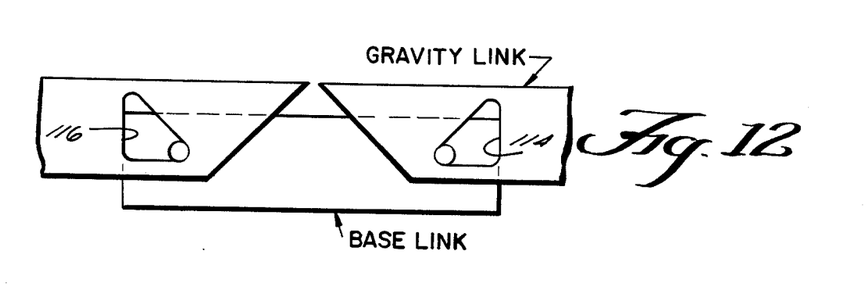
FIG. 12 is a fragmentary side elevational view similar to FIG. 4, but of a fifth embodiment, wherein the gravity links have relieved cam slots of the shape and orientation shown in FIG. 10.

In FIG. 12, there is shown an embodiment which combines features of the embodiments shown in FIGS. 4 and 10. The difference from the FIG. 4 embodiment is that the slots 114, 116 are opened-up (as described with respect to FIGS. 5–9), and these opened-up slots have the same shape and upright orientation as the slots of the FIG. 10 embodiment.

STRAIGHT RODS OR LUGS, GRAVITY-ASSISTED CAMMING, INVERTED SLOTS

Figure 13:
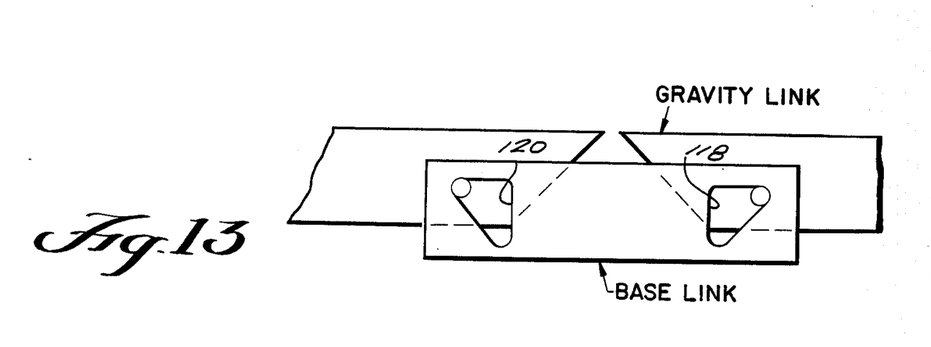
FIG. 13 is a fragmentary side elevational view similar to FIG. 4, but of a sixth embodiment, wherein the gravity links have slots of the shape and same inverted orientation shown in FIG. 11.

In FIG. 13, there is shown an embodiment which combines features of the embodiments shown in FIGS. 4 and 11. The difference from the FIG. 4 embodiment is that the slots 118, 120 are opened-up (as described with respect to FIGS. 5–9), and these opened-up slots have the same shape and inverted orientation as the slots of the FIG. 11 embodiment.

In both the embodiments of FIGS. 12 and 13 the weight of the links, especially when loaded with a conveyed product cause the camming to occur on the inside of the horizontal curve. As with the FIG. 4 embodiment, the bed on which the conveyor belt of FIG. 12 or 13 is travelling may itself be laterally slanted slightly within the curve, so that the support surfaces of the links remain level within the curve.

CAM ROD, EXTERNALLY ACTUATED, FOOT REACTION

Description is here given of the structures shown in FIGS. 14–17.

Figure 14:
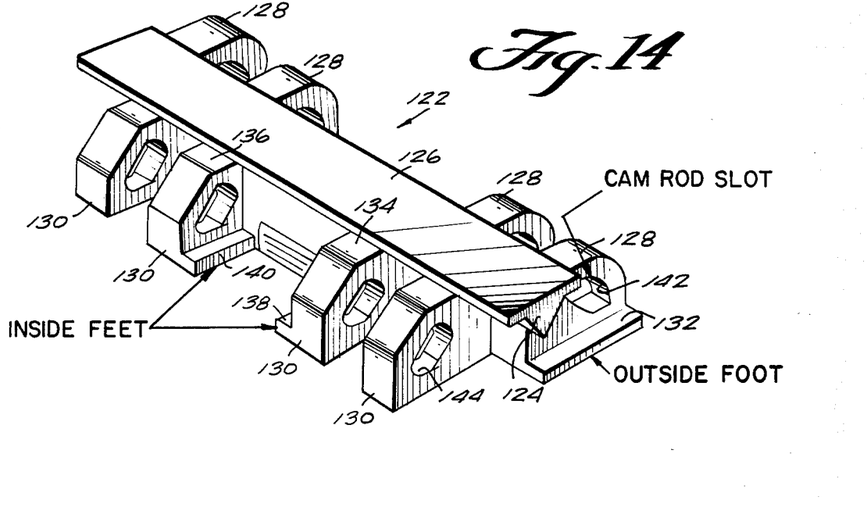
FIG. 14 is a perspective view of one link according to a seventh embodiment of the invention.

In FIG. 14, a single link 122 is shown in perspective. It has a body 124 extending widthwise of the conveyor belt, with an upwardly facing support surface 126. The body 124 has a plurality of leading link ends 128 spread across the lateral extent of the link, and a similar set of trailing link ends 130. The pintles 128 are staggered laterally with regard to the link ends 130, so that two links 122 can be placed with their adjacent trailing and leading link ends intercalated.

The link end of one set that will be laterally innermost in a horizontal curve is shown provided with a laterally inwardly-directed, horizontal flange-like foot 132, the term laterally inward being used in this sentence with reference to the path of the conveyor belt and not with regard to the link. Two oppositely nearest-to-medial ones 134, 136 of the link ends of the opposite set are shown provided with respective medially-directed flange-like feet 138, 140.

Each link end 130 is slotted to provide sets of opened-up, upright slots 142, 144 in accordance with the principles set forth hereinbefore in regard to FIGS. 5-10. The feet 132, 138, 140 are disposed beside and extend up to no higher than the lower extents of the respective slots 142, 144.

The links 122, when grouped together in a series, have the link ends of each leading link intercalated with the link ends of the adjacent trailing link, longitudinally of the conveyor belt. Accordingly, at each such intercalation, the cam slots 142, 144 are lined-up crosswise of the belt for receipt of a cam rod 146.

Figure 15:
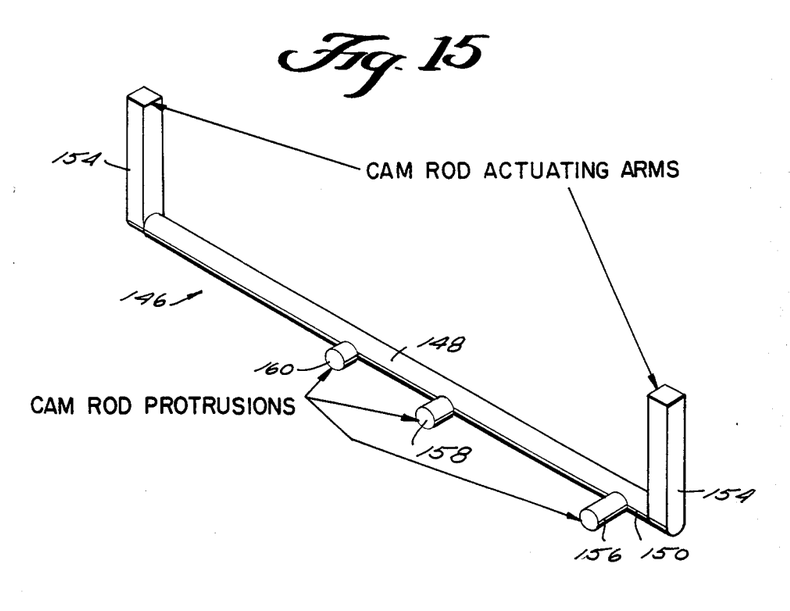
FIGS. 15 and 16 are similar perspective views of a cam rod designed for use with links of the kind illustrated in FIG. 14, the rod being shown in FIG. 15 oriented for straight-running of the belt, and being shown in FIG. 16 oriented for providing camming action for horizontal turning of the belt.
Figure 16:
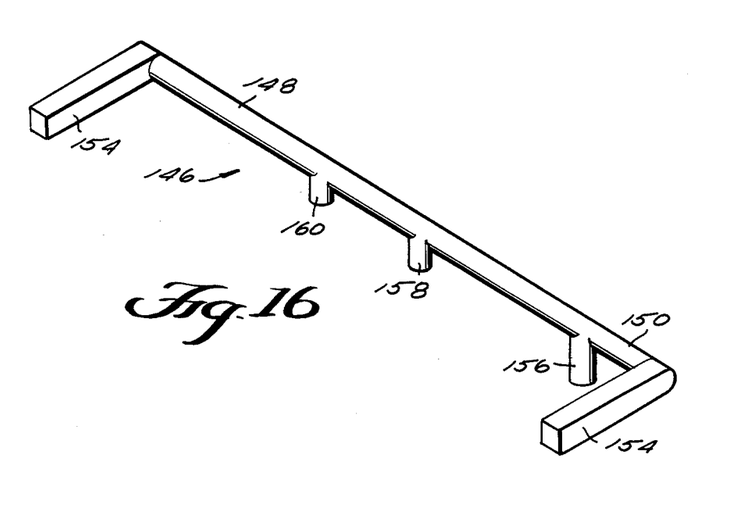

A cam rod 146 is shown by itself in FIGS. 15 and 16 and three links 122 are shown pivotally interconnected in series by two respective cam rods 146.

The cam slots 142, 144 are shown opened-up according to a pattern which permits the user to slide a cam rod 146 into place during installation, even though the cam rod 146 has a number of protrusions on it. Once the cam rod 146 is installed, keepers (not shown) may be mounted to it to prevent it from sliding out of the link end slots.

The cam rod 146 has a straight shaft 148 with an end 150 that will be oriented toward the inside of the horizontal curve, which rod end is hereby designated its inner end, and an end 152 that will be oriented toward the outside of the horizontal curve, which rod end is herein designated its outer end. At the inner end 150, the rod 146 is provided with an actuating arm 154 in the form of a crank lever. At a progression of locations along its length, starting near its inner end, the shaft 148 is shown provided with a series of peg-like protrusions 156, 158, 160. These all protrude in a radial direction in a common plane, which has a predetermined angular orientation relative to the actuating arm 154. The protrusions 156, 158, 160 are progressively shorter.

Figure 17:
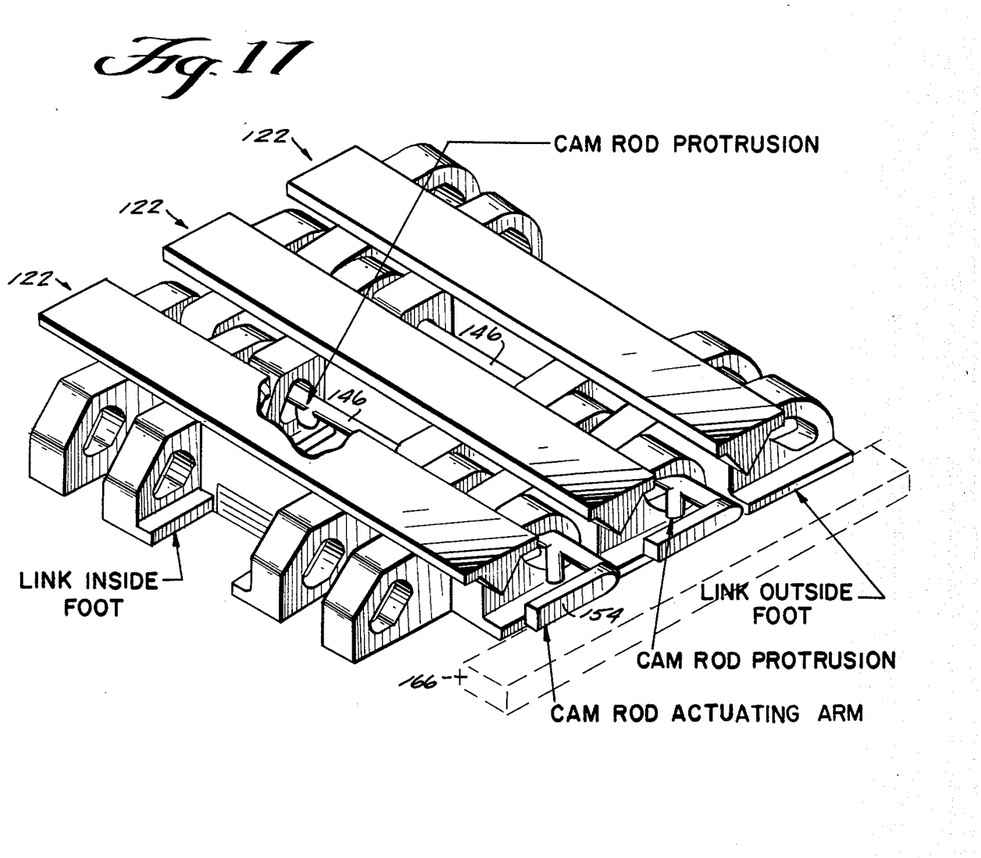
FIG. 17 is a perspective view showing three of the links of FIG. 14 interconnected by rods of FIGS. 15 and 16 (in the FIG. 16 orientation) all negotiating a horizontal curve, with cam rod protrusions engaging the feet of mating links.

When the belt of FIG. 17 is assembled, each protrusion 156, 158, 160 is juxtaposed directly above a respective foot 132, 138, 140 and the short portion 162 of each rod projects laterally inwardly (of the horizontal curve) past vertical juxtaposition with the foot 132, so that the actuating arms 154 are free to be pivoted downwards ninety degrees from the horizontal orientation shown in FIG. 17. Accordingly, in a straight run of the conveyor, all the actuating arms 154 are rotated in the direction of arrows 164 to point downwards. Interaction with some feature of the conveyor bed can be used to provide such rotation. Or the arms 154 may be weighted to rotate unless supported by a conveyor bed rail.

In any event, it should be apparent that when the arms 154 are rotated downwards, they do not interact with the feet 132, 138, 140 and, as a practical matter the rods 146 behave as if they are straight rods. Accordingly, the rods 146 ride at the lower ends of the cam surfaces across the width of the belt. However, when through interaction with a conveyor bed structural feature such as a rail 166, provided in a horizontal curve of the conveyor, the actuating arms are rotated to the horizontal condition shown in FIG. 17, whereupon each protrusion, 156, 158, 160 is rotated to stand on a respective foot 132, 138, 140. The protrusion 156 is so great in length relative to the height of the foot 132 that when the protrusion 156 stands on the foot 132 with the arm 154 level, the inner end of the rod 146 is pushed up the respective nearest cam slot surface to its upper end. The protrusions 158 and 160 simultaneously raise respective portions of the rod 146 by progressively less amounts sufficient to correspondingly longitudinally collapse the conveyor belt by a progressive amount across its width from the outside to the inside of the horizontal curve.

The three protrusion/three feet situation depicted in FIG. 17 is typical of a six-inch wide conveyor belt. Where the conveyor belt is wider, the links may be provided with more feet and the rod may be provided with correspondingly more protrusions, in a similar series of progressively shorter protrusions.

CAM ROD, EXTERNALLY ACTUATED, FOOT AND SLOT REACTION

Figure 18:
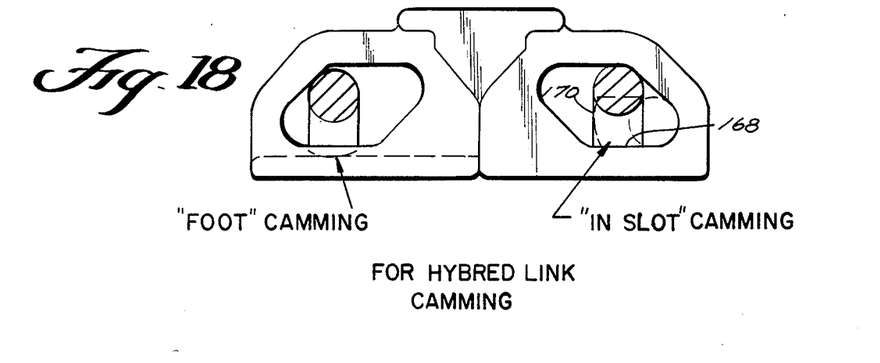
FIG. 18 is a side elevational view of a modification of the structures shown in FIGS. 14-17 to provide an eighth embodiment.

In FIG. 18, there is shown an inner end view of a modification of the link shown in FIG. 14. In FIG. 18, the FIG. 14 foot 132 on the leading pintle laterally closest to the inside of the curve is eliminated in favor of using the upwardly facing lower surface 168 of that slot as a foot and by correspondingly positioning and dimensioning the FIG. 14 protrusion 156 as a protrusion 170 to stand on the slot foot surface 168 when the actuating arm (FIG. 17) is rotated to a horizontal position.

The preferred shape of the slots of the FIGS. 14-17 and FIG. 18 embodiments shows best in FIG. 18, where the slots are relieved beyond a mere triangular shape to a diamond shape to facilitate installation of the cam rods.

At the left in FIG. 18 one of the protrusions is shown at the left standing on an inside foot. At the right, the rod is shown in dashed lines in the orientation it has for a straight run, and is shown in full lines the orientation it has for negotiating a horizontal curve.

STRAIGHT RUNNING

Figure 19:
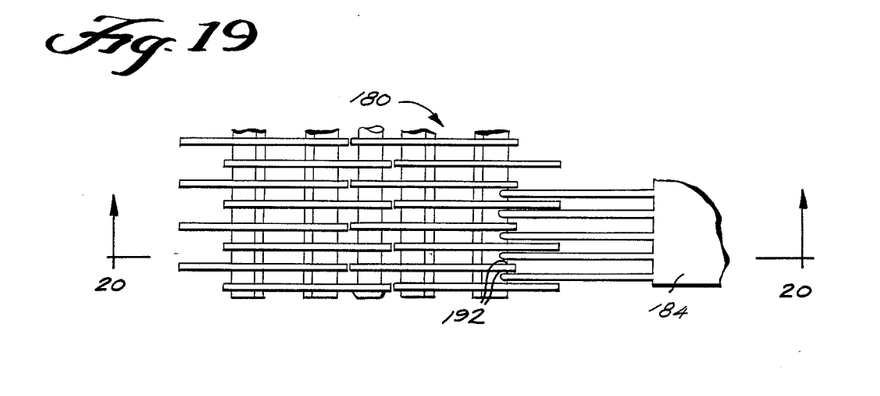
FIG. 19 is a fragmentary top plan view of a modification of the links to provide a straight-running belt of a ninth embodiment.
Figure 20:
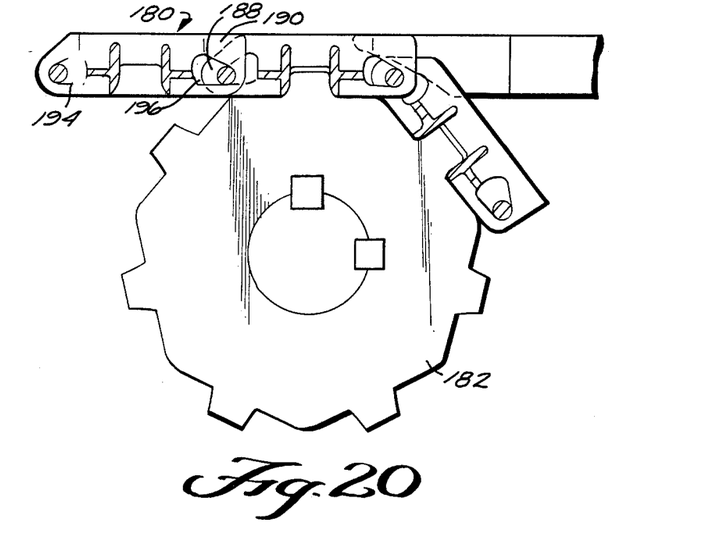
FIG. 20 is a fragmentary longitudinal vertical sectional view of the belt installation of FIG. 19, vertically turning about a sprocket assembly.

In FIGS. 19 and 20, a modification is shown in which the conveyor belt 180, while needing to be able to negotiate vertical turns, such as the one about the drive sprocket 182, next to the stationary platform 184, has no horizontal curves to negotiate. Accordingly, the links 186 may be designed so that their intercalated links end 188, 190 may be only slightly gapped from link to link longitudinally of the belt; i.e. the gaps 192 may be kept relatively small. However, it is strongly preferred that even in this instance, some spacing is provided, because the rods 192 are received through opened-up link end slots 194, 196 configured in accordance with the principles set forth hereinbefore with regard to FIGS. 5-9. Accordingly at one or more places along the run of the endless conveyor belt, by way of the means described hereinabove with regard to FIGS. 1-18, the links of the conveyor belt are slightly longitudinally condensed, not just on one side, but uniformly across the width, in order to permit cleaning nozzles (not shown) to direct a spray of cleaning solution into the interfacial regions 198 where, in normal operation, the pins nestle in a corner of the respective slots.

The conveyor belts of the present invention may be made of precisely the same materials as have been used in the prior art. For instance the links may be molded or extruded and fabricated of polypropylene, polyethylene or polycarbonate synthetic plastic resins, or made of metal such as stainless steel. The rods may be made of similar known materials. Thus a belt of the invention may be all plastic, plastic with metal rods, or metal with plastic rods. As described, the belt of each embodiment may be one, two or several links wide.

It should be apparent that the modular conveyor belting with cam-slotted links for maintaining transversal distribution of tension while negotiating horizontal curves and for facilitating cleaning as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. For an endless conveyor belt, a link, which, when incorporated in a longitudinally progressing series including a plurality of such links, with each two longitudinally adjacent ones of such links pivotally pinned together crosswise of the conveyor belt for mutual vertical pivotal movement about respective horizontal axes in order to negotiate vertical turns, equips the conveyor belt to also selectively longitudinally condense along at least one lateral margin, hereinafter designated an inner lateral margin, with belt tension spread across such links, said link comprising:

a body;

said body having a plurality of at least three leading link ends distributed across the width thereof and a plurality of at least three trailing link ends distributed across the width thereof, the leading and trailing link ends being so laterally spaced that the leading link ends of a said link may be intercalated with the trailing link ends of a first, like link when leading said link and so that the trailing link ends of said link may be intercalated with the leading link ends of a second, like link when trailing said link;

each link end having means defining a laterally opening slot therein for receiving a leading rod for pivotally connecting said link to said first, like link and for receiving a trailing rod for pivotally connecting said link to said second, like link;

each slot being elongated in an oblique direction, with that oblique direction of the slots in the leading link ends being a mirror image of that oblique direction of the slots in the trailing link ends;

each slot comprising a perimetrical sidewall one portion of which provides a camming surface which is oriented in said oblique direction, whereby when said link is assembled with the links and the links are pivotally interconnected by rods extending through respective slots of the intercalated link ends and the belt is run longitudinally under normal tension the links including said link tend to separate longitudinally of the conveyor belt as far as possible, given the spatial disposition of each rod, regardless of whether the belt is run along a straight path or one which includes a lateral curve, with the respective rods in tension-spreading engagement with said camming surfaces of said at least three leading link ends and said at least three trailing link ends of the links, including said link.

2. The conveyor belt link of claim 1, wherein: the leading link ends on said link are laterally staggered relative to the trailing link ends on said link.

3. The conveyor belt link of claim 1, further including:

means providing a surface toward at least one lateral extreme of said link which is oriented and positioned for coaction with a conveyor bed rail to hold-down the corresponding at least one lateral extreme of the link.

4. The conveyor belt link of claim 1, further including at least one foot surface on at least one leading link end of said link and at least one foot surface on at least one trailing link end of said link, each foot being adapted to be tread-upon by a respective protrusion on the respective rod when that rod is angularly rotated from one position to another position.

5. The conveyor belt link of claim 1, integrally molded of one of polypropylene, polyethylene and polycarbonate synthetic plastic resin.

6. The conveyor belt link of claim 1, wherein: the body has a normally upwardly presented, generally level conveyed-material supporting surface.

7. The conveyor belt link of claim 1, wherein: the oblique camming surface face downwards and are highest nearest said body of said link.

8. The conveyor belt link of claim 7, wherein: each said slot is substantially a straight slot.

9. The conveyor belt link of claim 7, wherein: said slot is opened-up and thereby relieved except at said camming surface.

10. The conveyor belt link of claim 9, wherein: said slot is opened-up generally triangularly.

11. The conveyor belt link of claim 9, wherein: said slot is opened-up in a generally diamond-shaped manner.

12. The conveyor belt link of claim 1, wherein: the oblique camming surfaces face upwards and are highest furthest from said body of said link.

13. The conveyor belt link of claim 12, wherein: each said slot is substantially a straight slot.

14. The conveyor belt link of claim 12, wherein: said slot is opened-up and thereby relieved except at said camming surface.

15. The conveyor belt link of claim 14, wherein: said slot is opened-up generally triangularly.

16. The conveyor belt link of claim 14, wherein: said slot is opened-up in a generally diamond-shaped manner.

17. A conveyor belt, comprising:

a plurality of links disposed in a longitudinally progressing series, a plurality of rods, each pivotally pinning together a respective longitudinally adjacent two of said links, with each two longitudinally adjacent links being thereby pivotally pinned together crosswise of the conveyor belt for mutual vertical pivotal movement about respective horizontal axes in order to negotiate vertical turns, and the conveyor belt being thereby equipped to also selectively longitudinally condense along at least one lateral margin, hereinafter designated an inner lateral margin, with belt tension spread across such belt, each such link comprising:

a body;

said body having a plurality of at least three leading link ends distributed across the width thereof an a plurality of at least three trailing link ends distributed across the width thereof, the leading and trailing link ends being so laterally spaced that the leading link ends of a said link may be intercalated with the trailing link ends of a first, like link when leading said link and so that the trailing link ends of said link may be intercalated with the leading link ends of a second, like link when trailing said link;

each link end having means defining a laterally opening slot therein for receiving a leading rod for pivotally connecting said link to said first, like link and for receiving a trialing rod for pivotally connecting said link to said second, like link;

each slot being elongated in an oblique direction, with that oblique direction of the slots in the leading link ends being a mirror image of that oblique direction of the slots in the trailing link ends;

each slot comprising a perimetrical sidewall one portion of which provides a camming surface which is oriented in said oblique direction, said links being so constructed, assembled and pivotally interconnected by said rods extending through respective slots of intercalated link ends that, as the belt is run longitudinally under normal tension, the links tend to separate longitudinally of the conveyor belt as far as possible given the spatial disposition of each rod, regardless of whether the belt is run along a straight path or one which includes a lateral curve, with the respective rods in tension-spreading engagement with said camming surfaces of said at least three leading link ends and said at least three trailing link ends of the links.

18. The conveyor belt of claim 17, wherein:
the leading link ends on each link are laterally staggered relative to the trailing link ends on that link.

19. The conveyor belt of claim 17, further including:
means providing a surface toward at least one lateral extreme of each link, which is oriented and positioned for coaction with a conveyor bed rail to holddown the corresponding at least one lateral extreme of each link at least some of the time.

20. The conveyor belt of claim 17, wherein:
said body of each said link has a normally upwardly presented, generally level conveyed-material supporting surface.

21. The conveyor belt of claim 17, wherein:
the oblique camming surfaces face downwards and are highest nearest said body of the respective link on which they are provided.

22. The conveyor belt of claim 21, wherein:
each said slot is substantially a straight slot.

23. The conveyor belt of claim 21, wherein:
each rod is normally carried near the lower ends of the respective camming surfaces and an upward force if applied upon the laterally inner end of any rod to forcibly raise that end while the laterally outer end thereof is permitted to remain low, the respective said links are progressively longitudinally condensed across the width of the conveyor belt towards the laterally inner margin of the conveyor belt.

24. The conveyor belt of claim 21, wherein:
each slot is opened-up and thereby relieved except at said camming surface thereof.

25. The conveyor belt of claim 21, wherein:
each slot is opened-up generally triangularly.

26. The conveyor belt of claim 24, wherein:
each slot is opened-up in a generally diamond-shaped manner.

27. The conveyor belt of claim 17, wherein:
the oblique camming surfaces face upwards and are highest furthest from said body of the respective link on which they are provided.

28. THe conveyor belt of claim 27, wherein:
each slot is substantially a straight slot.

29. The conveyor belt of claim 27, wherein:
each rod is normally carried near the upper ends of the respective camming surfaces and a downward force if applied upon the laterally inner end of any rod to forcibly raise that end while the laterally outer end thereof is permitted to remain high, the respective said links are progressively longitudinally condensed across the width of the conveyor belt towards the laterally inner margin of the conveyor belt.

30. The conveyor belt of claim 27, wherein:
each slot is opened-up and thereby relieved except at said camming surface thereof.

31. The conveyor belt of claim 30, wherein:
each slot is opened-up generally triangularly.

32. The conveyor belt of claim 30, wherein:
each slot is opened-up in a generally diamond-shaped manner.

33. The conveyor belt of claim 17,
each rod having at least one angularly discontinuous radial protrusion; and each link
further including at least one foot surface on at least one leading link end of each link and at least one foot surface on at least one trailing link end of each link, each foot being adapted to be tread-upon by a respective said protrusion on the respective rod when that rod is angularly rotated from one position to another position.

34. The conveyor belt of claim 33, wherein:
said foot surface on at least one of said link ends being located within the respective said slot on that link end.

35. The conveyor belt of claim 33, wherein:
said foot surface on at least one of said link ends is located laterally beside the respective said slot on that link end.

36. The conveyor belt of claim 33, wherein:
each rod has at least two of said radial protrusions spaced therealong and extending in the same angular plane from the axis of the respective rod;
the at least one foot surface on at least one leading link end being disposed to be tread-up by a respective one of said at least two radial protrusions located nearest a respective end of the respective rod and the at least one foot surface on at least one trailing link end of the relatively leading adjacent one of said links being disposed to be tread-upon by a respective other of said at least two radial protrusions, located further from said respective end of the respective rod than said one protrusion.

37. The conveyor belt of claim 36, wherein:
said one protrusion is radially longer than each said other protrusion and each said other protrusion is progressively radially shorter than said one protrusion.

38. The conveyor belt of claim 37, wherein:
when each rod is rotated the action of its protrusions upon the respective feet progressively lift the rod towards said one end thereof whereby said rod, acting upon the respective camming surfaces longitudinally contracts the belt on the laterally inner margin thereof.

39. A conveyor comprising:
a conveyor bed laid-out along a path that an endless conveyor belt is to follow, and arranged to support that conveyor belt during at least one run of that conveyor belt; and
a conveyor belt supported upon said conveyor bed in at least said one run, said conveyor belt, comprising:

a plurality of links disposed in a longitudinally progressing series, a plurality of rods, each pivotally pinning together a respective longitudinally adjacent two of said links, with each two longitudinally adjacent links being thereby pivotally pinned together crosswise of the conveyor belt for mutual vertical pivotal movement about respective horizontal axes in order to negotiate vertical turns, and the conveyor belt being thereby equipped to also selectively longitudinally condense along at least one lateral margin hereinafter designated an inner lateral margin, with belt tension spread across such belt, each such link comprising:

a body;

said body having a plurality of at least three leading link ends distributed across the width thereof and a plurality of at least three trailing link ends distributed across the width thereof, the leading and trailing link ends being so laterally spaced that the leading link ends of a said link may be intercalated with the trailing link ends of a first, like link when leading said link and so that the trailing link ends of said link may be intercalated with the leading link ends of a second, like link when trailing said link;

each link end having means defining a laterally opening slot therein for receiving a leading rod for pivotally connected said link to said first, like link and for receiving a trailing rod for pivotally connecting said link to said second, like link;

each slot being elongated in an oblique direction, with that oblique direction of the slots in the leading link ends being a mirror image of that oblique direction of the slots in the trailing link ends;

each slot comprising a perimetrical sidewall one portion of which provides a camming surface which is oriented in said oblique direction, said links being so constructed, assembled and pivotally interconnected by said rods extending through respective slots of intercalated link ends that, as the belt is run longitudinally under normal tension, the links tend to separate longitudinally of the conveyor belt as far as possible given the spatial disposition of each rod, regardless of whether the belt is run along a straight path or one which includes a lateral curve, with the respective rods in tension-spreading engagement with said camming surfaces of said at least three leading link ends and said at least three trailing link ends of the links.

40. The conveyor of claim 39, wherein:
the leading link ends on each link are laterally staggered relative to the trailing link ends on that link.

41. The conveyor of claim 39, further including:
said conveyor bed including a curved laterally inner rail as said at least one run for coaction with each link as such link negotiates said one run;
means providing a surface toward at least one lateral extreme of each link, said surface being oriented and positioned for coaction with said conveyor bed rail to hold-down the corresponding lateral extreme of each link as such link negotiates said one run.

42. The conveyor of claim 39, wherein:
said body of each said link has a normally upwardly presented, generally level conveyed-material supporting surface.

43. The conveyor of claim 39, wherein:
the oblique camming surfaces face downwards and are highest nearest said body of the respective link on which they are provided.

44. The conveyor of claim 43, wherein:
each said slot is substantially a straight slot.

45. The conveyor of claim 43, wherein:
each slot is opened-up and thereby relieved except at said camming surface thereof.

46. The conveyor of claim 45, wherein:
each slot is opened-up generally triangularly.

47. The conveyor of claim 45, wherein:
each slot is opened-up in a generally diamond-shaped manner.

48. The conveyor of claim 43, wherein:
each rod is normally carried near the lower ends of the respective camming surfaces and an upward force if applied upon the laterally inner end of any rod to forcibly raise that end while the laterally outer end thereof is permitted to remain low, the respective said links are progressively longitudinally condensed across the width of the conveyor belt towards the laterally inner margin of the conveyor belt.

49. The conveyor of claim 48, further comprising:
said conveyor bed including a curved laterally inner rail at said at least one run for providing said upward force.

50. The conveyor of claim 49, wherein:
said conveyor bed curved laterally inner rail further includes surface means for coaction with each link as such link negotiates said one run; and
further including:
means providing a surface toward at least one lateral extreme of each link, said surface being oriented and positioned for coaction with said conveyor bed rail to hold-down the corresponding lateral extreme of each link as such link negotiates said one run.

51. The conveyor of claim 39 wherein:
the oblique camming surfaces face upwards and are highest furthest from said body of the respective link on which they are provided.

52. The conveyor of claim 51, wherein:
each slot is substantially a straight slot.

53. The conveyor of claim 51, wherein:
each slot is opened-up and thereby relieved except at said camming surface thereof.

54. The conveyor of claim 53, wherein:
each slot is opened-up generally triangularly.

55. The conveyor of claim 53, wherein:
each slot is opened-up in a generally diamond-shaped manner.

56. The conveyor of claim 51, wherein:
each rod is normally carried near the upper ends of the respective camming surfaces and a downward force if applied upon the laterally inner end of any rod to forcibly raise that end while the laterally outer end thereof is permitted to remain high, the respective said links are progressively longitudinally condensed across the width of the conveyor belt towards the laterally inner margin of the conveyor belt.

57. The conveyor of claim 56, further comprising:
said conveyor bed including a curved laterally inner rail at said at least one run for providing said downward force.

58. The conveyor of claim 57, wherein:

said conveyor bed curved laterally inner rail further includes surface means for coaction with each link as such link negotiates said one run; and further including means providing a surface toward at least one lateral extreme of each link, said surface being oriented and positioned for coaction with said conveyor bed rail to hold-down the corresponding lateral extreme of each link as such link negotiates said one run.

59. The conveyor of claim 39, further including:

each rod having at least one angularly discontinuous radial protrusion; and each link further including at least one foot surface on at least one leading link end of each link and at least one foot surface on at least one trailing link end of each link, each foot being adapted to be tread-upon by a respective said protrusion on the respective rod when that rod is angularly rotated from one position to another position.

60. The conveyor of claim 59, wherein:

said foot surface on at least one of said link ends being located within the respective said slot on that link end.

61. The conveyor of claim 59, wherein:

said foot surface on at least one of said link ends is located laterally beside the respective said slot on that link end.

62. The conveyor of claim 59, wherein:

each rod has at least two of said radial protrusions spaced therealong and extending in the same angular plane from the axis of the respective rod;

the at least one foot surface on at least one leading link end being disposed to be tread-upon by a respective one of said at least two radial protrusions located nearest a respective end of the respective rod and the at least one foot surface on at least one trailing link end of the relatively leading adjacent one of said links being disposed to be tread-upon by a respective other of said at least two radial protrusions, located further from said respective end of the respective rod than said one protrusion.

63. The conveyor of claim 62, wherein:

said one protrusion is radially longer than each said other protrusion and each said other protrusion is progressively radially shorter than said one protrusion.

64. The conveyor of claim 63, wherein:

when each rod is rotated the action of its protrusions upon the respective feet progressively lift the rod towards said one end thereof whereby said rod, acting upon the respective camming surfaces longitudinally contracts the belt on the laterally inner margin thereof.

65. The conveyor of claim 64, further including:

a crank arm on each rod; and a surface means provided on said conveyor bed in said one run for coation with each crank arm to rotate each rod to activate said feet in said one run.

66. A conveyor belt, comprising:

a plurality of gravity links disposed in a longitudinally progressing series;

a plurality of pivot pin bar means, each constituted by a respective base link pivotally pinning together a respective longitudinally adjacent two of said gravity links, with each two longitudinally adjacent gravity links being thereby pivotally pinned together crosswise of the conveyor belt for mutual vertical pivotal movement about a respective leading horizontal axis and a respective trailing horizontal axis provided by two respective sets of pivot pin means on each said base link, for negotiating vertical turns, and the conveyor belt being thereby equipped to also selectively longitudinally condense along at least one lateral margin hereinafter designated an inner lateral margin, each such gravity link comprising:

a body having a conveyed material supporting surface;

said body having a plurality of at least three leading link ends distributed across the width thereof and a plurality of at least three trailing link ends distributed across the width thereof, the leading and trailing link ends being so laterally spaced that the leading link ends of each said gravity link may be intercalated with a respective said base link and the trailing link ends of the respectively leading gravity link may be intercalated with the same said base link;

each trailing link end of each leading gravity link having means defining a laterally opening slot therein for receiving a respective said pivot pin means for pivotally connecting that gravity link to the respective said base link and each leading link end of each trailing gravity link having means defining a laterally opening slot therein for receiving a respective said pivot pin means for pivotally connecting that gravity link to the same respective said base link;

each slot being elongated in an oblique direction, with that oblique direction of the slots in the leading link ends being a mirror image of that oblique direction of the slots in the trailing link ends;

each slot comprising a perimetrical sidewall one portion of which provides a camming surface which is oriented in said oblique direction, the conveyor belt being assembled so that in the longitudinal direction, gravity links are alternated with base links, with the respective pivot pin means of the base links being received in the respective slots of the respective gravity links, so that as the belt is run longitudinally under normal tension the links tend to separate longitudinally of the conveyor belt as far as possible given the spatial disposition of each pivot pin means, regardless of whether the belt is run along a straight path or one which includes a lateral curve, with the respective pivot pin means in tension-spreading engagement with said camming surfaces of said at least three leading link ends and said at least three trailing link ends of the links.

67. The conveyor belt of claim 66, wherein:

each base link includes means providing a support surface adapted to support the conveyor belt on a conveyor bed with the gravity links floating above the conveyor bed upon the respective intervening base links.

68. The conveyor belt of claim 66, wherein:

the oblique camming surfaces face downwards and are highest nearest said body of the respective gravity link on which they are provided.

69. The conveyor belt of claim 68, wherein:

each slot is opened-up and thereby relieved except at said camming surface thereof.

70. The conveyor belt of claim 66, wherein:

the oblique camming surfaces face upwards and are highest furthest from the body of the respective link on which they are provided.

71. The conveyor belt of claim 70, wherein:
each slot is opened-up and thereby relieved except at said camming surface thereof.

72. A conveyor, comprising:
a conveyor bed laid-out along a path that an endless conveyor belt is to follow, and arranged to support that conveyor belt during at least one run of that conveyor belt; and
a conveyor belt supported upon said conveyor bed in at least said one run, said conveyor belt, comprising:
a plurality of gravity links disposed in a longitudinally progressing series;
a plurality of pivot pin bar means, each constituted by a respective base link pivotally pinning together a respective longitudinally adjacent two of said gravity links, with each two longitudinally adjacent gravity links being thereby pivotally pinned together crosswise of the conveyor belt for mutual vertical pivotal movement about a respective leading horizontal axis and a respective trailing horizontal axis provided by two respective sets of pivot pin means on each said base link, for negotiating vertical turns, and the conveyor belt being thereby equipped to also selectively longitudinally condense along at least one lateral margin hereinafter designated an inner lateral margin,
each such gravity link comprising:
a body having a conveyed material supporting surface;
said body having a plurality of at least three leading link ends distributed across the width thereof and a plurality of at least three trailing link ends distributed across the width thereof, the leading and trailing link ends being so laterally spaced that the leading link ends of each said gravity link may be intercalated with a respective said base link and the trailing link ends of the respectively leading gravity link may be intercalated with the same said base link;
each trailing link end of each leading gravity link having means defining a laterally opening slot therein for receiving a respective said pivot pin means for pivotally connecting that gravity link to the respective said base link and each leading link end of each trailing gravity link having means defining a laterally opening slot therein for receiving a respective said pivot pin means for pivotally connecting that gravity link to the same respective said base link;
each slot being elongated in an oblique direction, with that oblique direction of the slots in the leading link ends being a mirror image of that oblique direction of the slots in the trailing link ends;
each slot comprising a perimetrical sidewall one portion of which provides a camming surface which is oriented in said oblique direction,
the conveyor belt being assembled so that in the longitudinal direction, gravity links are alternated with base links, with the respective pivot pin means of the base links being received in the respective slots of the respective gravity links, so that as the belt is run longitudinally under normal tension the links tend to separate longitudinally of the conveyor belt as far as possible given the spatial disposition of each pivot pin means, regardless of whether the belt is run along a straight path or one which includes a lateral curve, with the respective pivot pin means in tension-spreading engagement with said camming surfaces of said at least three leading link ends and said at least three trailing link ends of the links;
each base link including means providing a support surface being supported on said conveyor bed with said gravity links floating above the conveyor bed upon the respective intervening base links.

* * * * *